United States Patent Office 3,548,231
Patented Dec. 15, 1970

3,548,231
HOMOPOLAR ELECTRICAL MACHINES
Robert B. MacNab, Fossway, Newcastle upon Tyne, England, assignor to International Research & Development Company Limited, Fossway, Newcastle upon Tyne, England
Filed Feb. 3, 1969, Ser. No. 796,081
Claims priority, application Great Britain, Feb. 8, 1968, 6,385/68
Int. Cl. H02k 31/00
U.S. Cl. 310—178      2 Claims

ABSTRACT OF THE DISCLOSURE

A homopolar electrical machine with a multiplicity of conducting paths on its rotor which are interconnected in series by way of stationary brushes in which, in order to avoid large voltage differences between adjacent mutually-insulated contact segments engaged by the brushes, the conducting paths are divided into two sets which are connected in parallel between terminals connected to diametrically opposite brushes.

---

Figure 1:
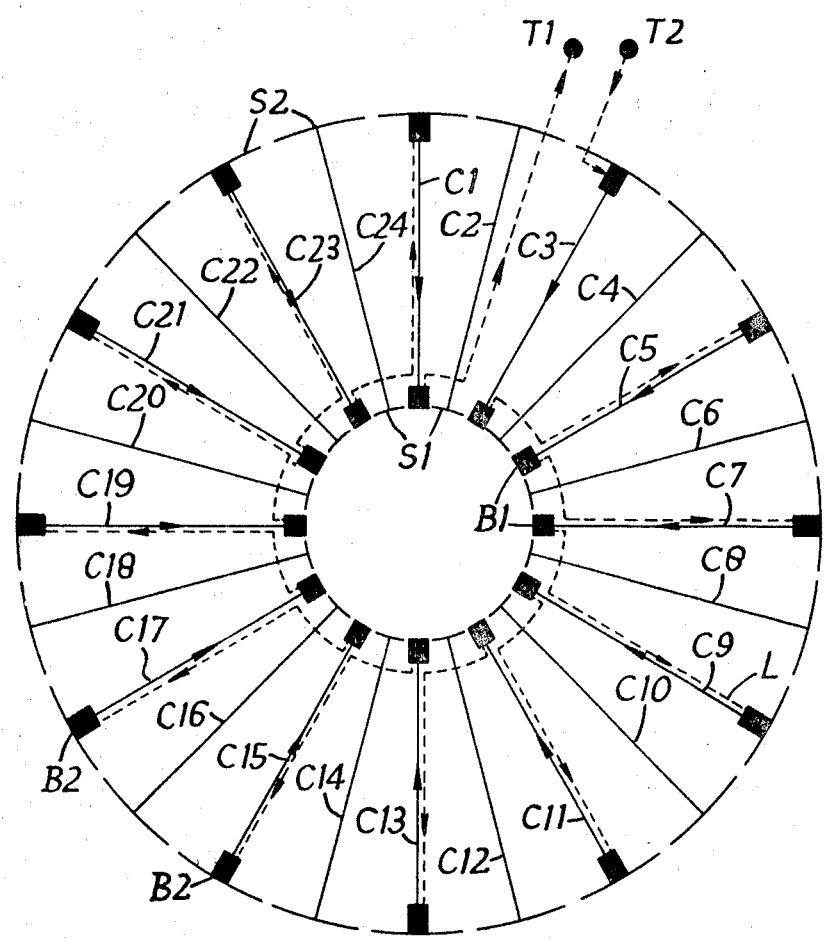

This invention relates to homopolar electrical machines of the kind described in copening application Ser. No. 693,548 filed December 26, 1967, now U.S. Pat. 3,497,739.

In that application there is described a homopolar machine with a disc rotor which is divided into individual conducting paths of sector shape connected between contact segments of an inner ring and contact segments of an outer ring. The inner and outer rings of contact segments co-operate with separate sets of stationary brushes and the brushes of the two sets are so interconnected that the conducting paths of the rotor are connected in series between the terminals of the machine to multiply the voltage. The spacing of the brushes is twice that of the associated contact segments so that in some positions of the rotor alternate conducting paths are connected in series and the remainder disconnected, while in intermediate positions of the rotor each brush bridges a pair of contact segments and pairs of parallel-connected conducting paths are connected inseries.

Reference should be made to the aforementioned application for particulars of this machine and possible modifications of it.

In the machine described in the said application the terminals of the machine are connected to a brush of one set and a brush which is adjacent the corresponding brush of the other set so that in the intermediate positions of the rotor a voltage close to the operating voltage of the machine exists between adjacent contact segments. This may subject the insulation between the segments and between the conducting paths to which they are connected to undesirable stresses.

In accordance with the present invention there is provided a homopolar machine having a rotor carrying a plurality of conducting paths disposed around the rotor and a stator comprising means for generating a magnetic field which is cut by the conducting paths as the rotor rotates wherein each conducting path has a contact segment at each end thereof the contact segment at one end of the path forming one of a first set of contact segments and the contact segment at the other end of the path forming one of a second set of contact segments, first and second sets of brushes are mounted to co-operate with the first and second sets of contact segments, the brushes being dimensioned so that each brush bridges adjacent contact segments in passing from one brush to another, and electrical connections are provided between brushes of the first set and brushes of the second set to continuously effect as the rotor rotates a series connection of selected conducting paths between terminals for connection to an external circuit, the brush spacing being such that each conducting path is disconnected form the terminals in passing between adjacent brushes, characterised in that the connections between the brushes and the terminals are arranged to divide the conducting paths into two sections lying on opposite sides of a diameter of the rotor and to connect the series connected conducting paths of the two sections in parallel between the terminals.

There are thus two parallel circuits between the terminals each including series connected conducting paths from one half of the rotor. This can be achieved by connecting one terminal to two adjacent brushes of one set and the other terminal to two adjacent brushes of the other set lying at positions diametrically opposite the positions of the brushes connected to the one terminal.

The invention will now be described in more detail by way of example with reference to the accompanying diagrammatic drawings in which:

FIG. 1 shows a typical arrangement of conducting paths on a rotor of a homopolar machine as in the aforesaid copending application Ser. No. 693,548, now U.S. Pat. 3,497,739.

Figure 2:
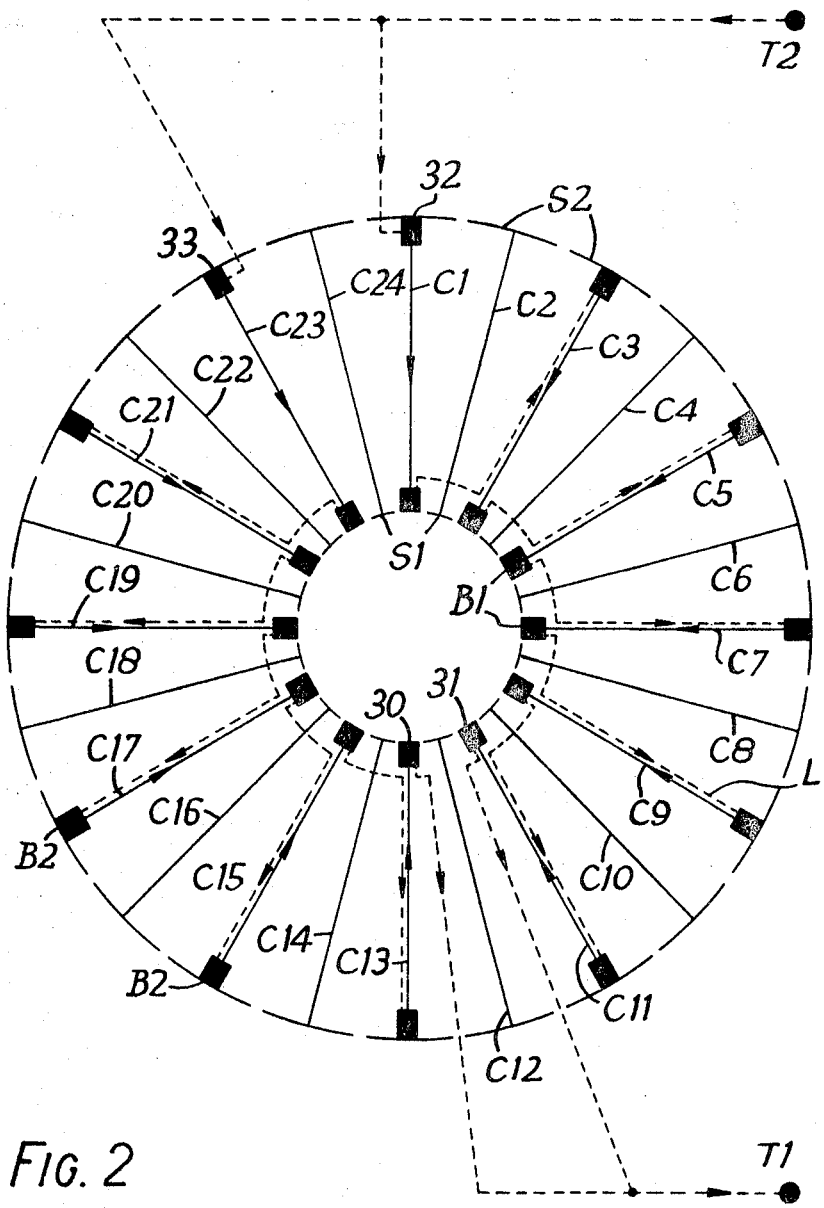

FIG. 2 shows an arrangement of conducting paths on the same rotor as in FIG. 1 but showing connections between the conducting paths and an external circuit in accordance with the present invention.

Referring first of all to FIG. 1 a disc-type rotor of a homopolar machine is shown. Mounted on the disc are a number of radial conducting paths $C_1$–$C_{24}$. Each conducting path is connected to a segment at each end thereof. The radially inner ends of the conducting paths are connected to segments of an inner set $S_1$ whilst the radially outer ends are connected to segments of an outer set $S_2$. The individual segments of each set are insulated from one another by electrical insulation (not shown) so that the segments and intervening insulation of each set form a complete segmental ring.

Sliding on each segmental ring as the rotor rotates are two sets of brushes. Brushes $B_1$ form an innter set engaging segments $S_1$ whilst brushes $B_2$ form an outer set engaging segments $S_2$.

The brush spacing and width is such that for given positions of the rotor such as that shown alternate conducting paths are connected to an external circuit through terminals $T_1$ and $T_2$ via brushes engaging the segments at the ends of the said conducting paths as shown. The brushes are connected by leads L in such a way that a brush connected to a segment on one conducting path, say a segment of an inner set, is connected to a brush of the outer set engaging, for the position shown, a segment of the next but one conducting path. In this way the alternate conducting paths are connected in series whilst the intervening conducting paths are disconnected from the external circuit.

Further rotation of the rotor from the position shown brings the brushes to a position where they bridge the insulation separating adjacent segments and then instead of alternate conducting paths being connected in series each pair of conducting paths spanned by a brush are connected in series with other pairs, the paths of each being connected in parallel.

With further rotation of the rotor the conducting paths which in the previous position were disconnected become connected in series whilst the intervening conductors previously connected in series become disconnected. This sequence is repeated as the rotor rotates.

With the arrangement described in FIG. 1 and assuming that the voltage developed across each series connected path was 20 volts, the operating voltage of the machine would be 240 volts and twelve conducting paths are connected in series. This means that the insulation separating the segments of conducting paths $C_1$, $C_2$, and $C_3$ is subject to a voltage of the order of 240 volts. The insulation between other segments is also subject to a voltage of the same order as the rotor rotates and the segments occupy positions corresponding to those connected with paths $C_1$, $C_2$ and $C_3$ as shown in FIG. 1.

The arrangement shown in FIG. 2 is basically the same as that shown in FIG. 1 except that the conducting paths are sub-divided into two sections, one section being formed by conducting paths $C_1$–$C_{12}$ on one side of the rotor and the other section by conducting paths $C_{13}$–$C_{24}$ on the diametrically opposite side of the rotor as shown. In the position illustrated conducting paths $C_1$, $C_3$, $C_5$, $C_7$, $C_9$ and $C_{11}$ are connected in series between terminals $T_1$ and $T_2$ and conducting paths $C_{13}$, $C_{15}$, $C_{17}$, $C_{19}$, $C_{21}$ and $C_{23}$ are also connected in series across terminals $T_1$ and $T_2$. If as in the previous case it is assumed that 20 volts develops across each conducting path the voltage developed across each section is 120 volts so that the operating voltage is reduced by half. At the same time, however, the voltage across insulation between segments is substantially reduced in that it is never more than the voltage developed across a conducting path. In the example quoted it would be possible to allow the voltage developed across each conducting path to be say 40 volts and the operating voltage to the machine would again be 240 volts.

In an alternative form twice the number of conducting paths can be used in which case the operating voltage would again be 240 volts in the example quoted.

The connection of the conducting paths in the manner described with two sections, lying on opposite halves of the rotor, connected in parallel is achieved by alteration of the connections between the brushes and the terminals. In FIG. 2 the terminal $T_1$ is connected to adjacent brushes 30 and 31 of the inner set of brushes $B_1$ and the terminal $T_2$ is connected to adjacent brushes 32 and 33 of the outer set of brushes $B_2$. The brushes 30 and 31 lie diametrically opposite the brushes 32 and 33. One current path is established from the brush 30 to the brush 33 and a parallel current path from the brush 31 to the brush 32.

Whilst the invention has been described with particular reference to a disc-type rotor it could also be applied to a drum-type rotor in which the conducting paths lie parallel or substantially parallel to the axis of rotation.

The conducting paths may take the form of conductors of uniform cross-section and be mounted on a support disc or they could be of truncated sector shape in which case they could be mounted on a support disc or could themselves with insulation separating them form the rotor body. The magnetic field coil is mounted in a stator, not shown, and produces a magnetic field the lines of force of which cut the plane of the disc.

The machine may be used as a homopolar motor or generator.

What is claimed is:

1. A homopolar electrical machine having a disc rotor carrying a plurality of conducting paths disposed around the rotor and extending radially of the rotor and a stator comprising means for generating a magnetic field which is cut by the conducting paths as the rotor rotates wherein each conducting path has a contact segment at each end thereof the contact segment at one end of the path forming one of a first set of contact segments and the contact segment at the other end of the path forming one of a second set of contact segments, first and second sets of brushes are mounted to cooperate with the first and second sets of contact segments, the brushes being dimensioned so that each brush bridges adjacent contact segments in passing from one segment to another, and electrical connections are provided between brushes of the first set and brushes of the second set to continuously effect as the rotor rotates a series connection of selected conducting paths between terminals for connection to an external circuit, the brush spacing being such that each conducting path is disconnected from the terminals in passing between adjacent brushes, characterised in that the connections between the brushes and the terminals are arranged to divide the conducting paths into two sections lying on oposite sides of a diameter of the rotor and to connect the series connected conducting paths of the two sections in parallel between the terminals.

2. A homopolar electrical machine as claimed in claim 1 in which one terminal is connected to two adjacent brushes of one set and the other terminal to two adjacent brushes of the other set lying at positions diametrically opposite the positions of the brushes connected to the one terminal.

References Cited
UNITED STATES PATENTS

| | | | |
|---|---|---|---|
| 1,255,838 | 2/1918 | Knoll | 310—178 |
| 2,472,134 | 6/1949 | Weiss | 310—177 |
| 3,229,133 | 1/1966 | Seras | 310—178 |

FOREIGN PATENTS

| | | | |
|---|---|---|---|
| 1,549,953 | 1/1968 | France | 310—178 |

MILTON O. HIRSHFIELD, Primary Examiner

R. SKUDY, Assistant Examiner